United States Patent
Farrow et al.

(10) Patent No.: US 7,055,993 B2
(45) Date of Patent: Jun. 6, 2006

(54) ADJUSTABLE LIGHT ASSEMBLY FOR A MOTORCYCLE

(76) Inventors: Freeman Lewis Farrow, 1409 E. Stadium, Ann Arbor, MI (US) 48104; Stephen Laurence Farrow, 110 Virginia Park, Detroit, MI (US) 48202; Donald Leon Farrow, 7704 Ellen Croft La., Charlotte, NC (US) 28215

( * ) Notice: Subject to any disclaimer, the term of this patent is extended or adjusted under 35 U.S.C. 154(b) by 120 days.

(21) Appl. No.: 10/771,783

(22) Filed: Feb. 4, 2004

(65) Prior Publication Data
US 2005/0169001 A1 Aug. 4, 2005

(51) Int. Cl.
*B60Q 1/10* (2006.01)

(52) U.S. Cl. ................. 362/469; 362/464; 362/473; 362/465

(58) Field of Classification Search ........ 362/475–476, 362/464–465, 469, 523, 269, 276, 285, 370, 362/403, 418–419, 449, 427–428, 401, 473, 362/525, 287

See application file for complete search history.

(56) References Cited

U.S. PATENT DOCUMENTS

| | | | | |
|---|---|---|---|---|
| 1,543,150 A | * | 6/1925 | Carlson et al. | 362/427 |
| 1,593,075 A | | 7/1926 | Hensley | |
| 1,635,393 A | | 7/1927 | Amans | |
| 3,939,339 A | * | 2/1976 | Alphen | 362/467 |
| 4,024,388 A | | 5/1977 | Skoff | |
| 4,075,469 A | | 2/1978 | Alphen | |
| 4,237,524 A | * | 12/1980 | Hundemer | 362/475 |
| 4,356,536 A | * | 10/1982 | Funabashi et al. | 362/476 |
| 4,868,720 A | * | 9/1989 | Miyauchi et al. | 362/466 |
| 5,426,571 A | * | 6/1995 | Jones | 362/466 |
| 5,599,085 A | | 2/1997 | Tabata et al. | |
| 6,414,593 B1 | | 7/2002 | Conner et al. | |
| 2004/0246732 A1 | * | 12/2004 | Lewis | 362/475 |

FOREIGN PATENT DOCUMENTS

JP        62096148 A  *  5/1987

* cited by examiner

*Primary Examiner*—Stephen Husar
*Assistant Examiner*—Robert May
(74) *Attorney, Agent, or Firm*—Miller, Canfield, Paddock and Stone; Robert K. Roth

(57) ABSTRACT

An adjustable light assembly is disclosed comprising, a light and an attachment bracket adapted to secure the light to the vehicle. As the vehicle leans the light pivots directly in response to the pull of gravity in a direction opposite the lean of the vehicle.

12 Claims, 3 Drawing Sheets

ADJUSTABLE LIGHT ASSEMBLY FOR A MOTORCYCLE

FIELD OF THE INVENTION

This invention relates to improvements in light assemblies, and more particularly to improvements in light assemblies used in motor vehicles such as motorcycles.

BACKGROUND OF THE INVENTION

Light assemblies mounted on motorcycles are generally fixed in place so as to be properly aligned to provide a light beam to illuminate a desired area in front of the motorcycle when the motorcycle is generally vertically aligned with the ground. However, motorcycles lean with respect to the ground as they make left and right turns. This can cause the light assembly to either shine light down into the ground before the desired area or up into the air beyond the desired area. This last condition is particularly problematic when there is fog or smoke, as light shining into such fog can be reflected back to the driver of the motorcycle, causing undesirable glare and interfering with the view of the driver.

Some attempts have been made to compensate for the tilting of the light beam caused by tilting of a vehicle. U.S. Pat. No. 5,599,085 to Tabata et al discloses a motorcycle headlight which is adjustable in response to tilting of the motorcycle. A sensor senses a change of position of the motorcycle and sends a signal to one or more solenoids to adjust the position of the headlight with respect to the vehicle to compensate for vehicle tilting. However, Tabata et al is a relatively complex and expensive mechanism, and has not seen significant commercial use. U.S. Pat. No. 4,075,469 to Alphen et al discloses a motorcycle lighting system wherein a gyroscope adjusts an optical system to compensate for the angle of inclination of the motorcycle as it turns. However, Alphen et al, and the other known designs have relatively complex and expensive mechanisms, and has not seen significant commercial use.

U.S. Pat. No. 1,593,075 to Hensley discloses a headlight system for locomotives where a headlight is connected to a pendulum by a bevel gear so that as the locomotive turns around a bend the pendulum pivots with gravity and urges the headlight to pivot about an axis vertical with respect to the vehicle.

It would be highly desirable to have a low cost, easy to construct light assembly for a motorcycle which compensates for the lean of the motorcycle as it turns.

SUMMARY OF THE INVENTION

In accordance with a first aspect, an adjustable light assembly comprises a light and an attachment bracket adapted to secure the light to the vehicle. As the vehicle leans the light pivots directly in response to the pull of gravity in a direction opposite the lean of the vehicle.

From the foregoing disclosure and the following more detailed description of various preferred embodiments it will be apparent to those skilled in the art that the present invention provides a significant advance in the technology of adjustable light assemblies. Particularly significant in this regard is the potential the invention affords for providing a high quality, low cost adjustable light assembly. Additional features and advantages of various preferred embodiments will be better understood in view of the detailed description provided below.

Figure 1:
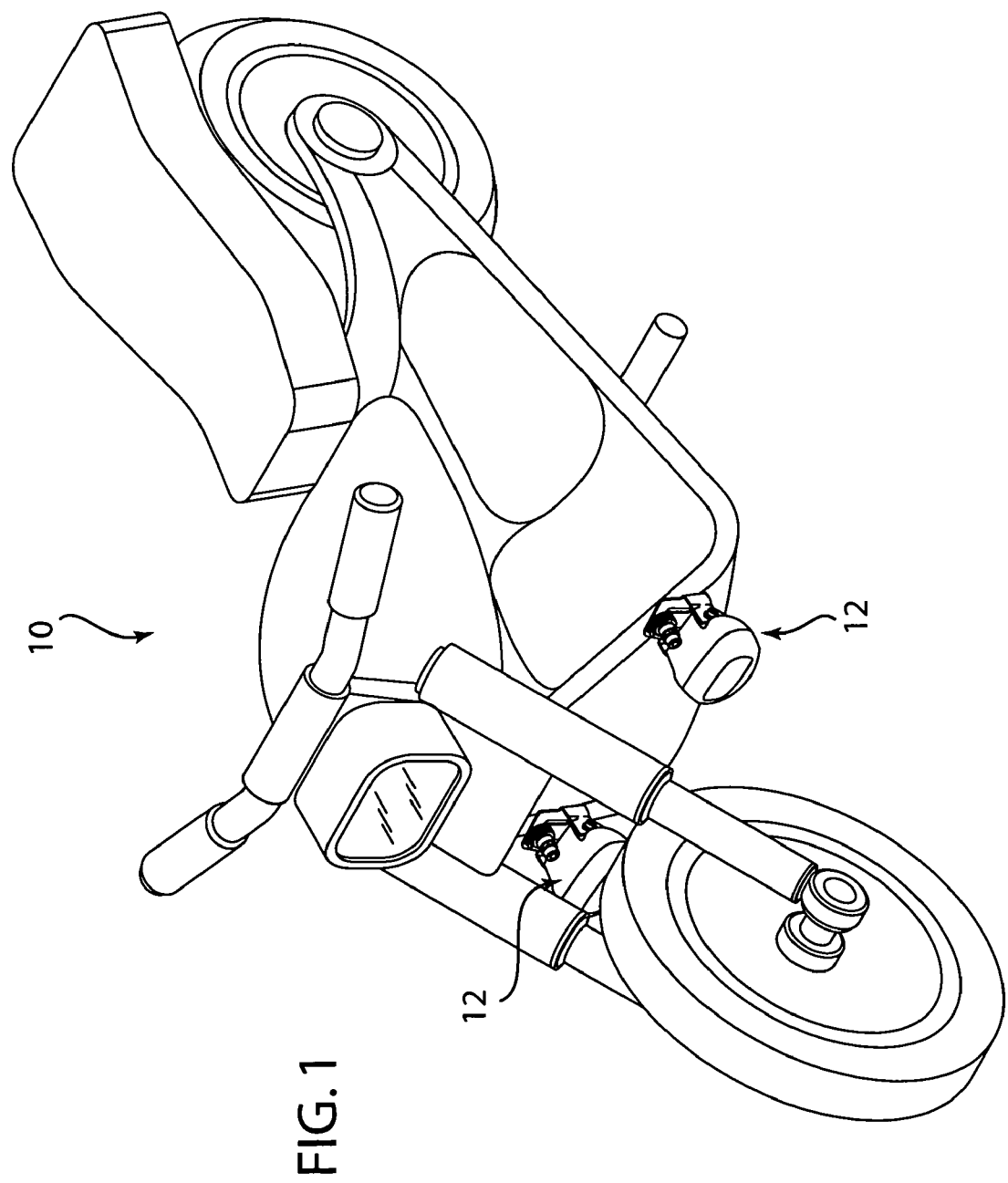
FIG. 1 is a view of a light assembly attached to a motorcycle in accordance with a preferred embodiment.

It should be understood that the appended drawings are not necessarily to scale, presenting a somewhat simplified representation of various preferred features illustrative of the basic principles of the invention. The specific design features of the light assembly as disclosed here, including, for example, the specific dimensions of the bearings, will be determined in part by the particular intended application and use environment. Certain features of the illustrated embodiments have been enlarged or distorted relative to others to enhance visualization and clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the light assembly disclosed here. The following detailed discussion of various alternative and preferred features and embodiments will illustrate the general principles of the invention with reference to a light assembly particularly suitable for use as a fog light for a motorcycle. Such a light assembly can provide night-visibility augmentation with nominal intervention. Other embodiments suitable for other applications will be apparent to those skilled in the art given the benefit of this disclosure.

Referring now to the drawings, FIG. 1 shows a motorcycle 10 with left and right light assemblies 12. The light assemblies 12 project a beam of light out to a desired area in front of the motorcycle to enhance the view of a driver. The light assemblies can act as fog lamps in that they preferably have a vertical cut off design, reducing light scattering and glare by partially preventing light from shining upwards, and by choice of frequency of light emitted by the light assembly.

Figure 2A:
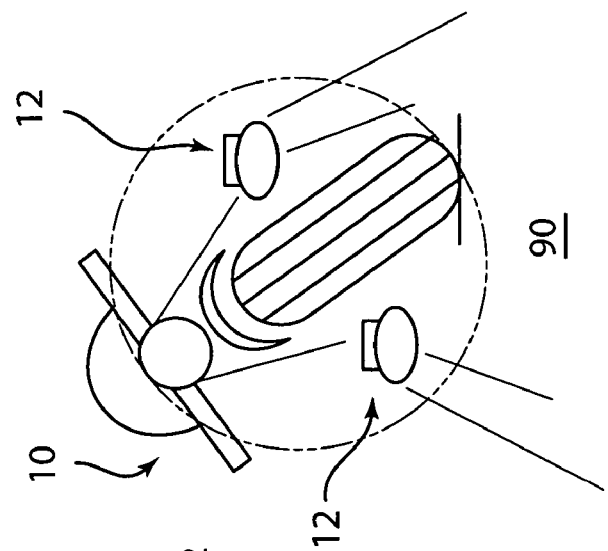
FIGS. 2A–2C are views of the motorcycle with left and right light assemblies shown in three positions: Left Turn (FIG. 2A); Straight Riding (FIG. 2B); and Right Turn (FIG. 2C); showing that the light assemblies stay generally aligned with the pull of gravity as the motorcycle leans in either direction.
Figure 2B:
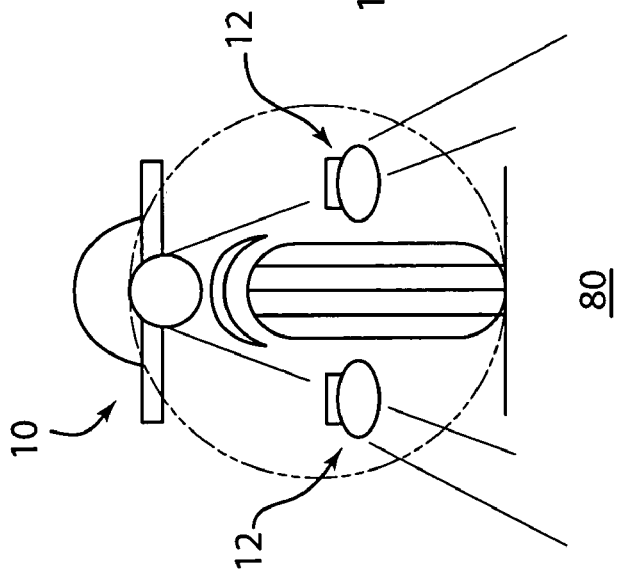
Figure 2C:
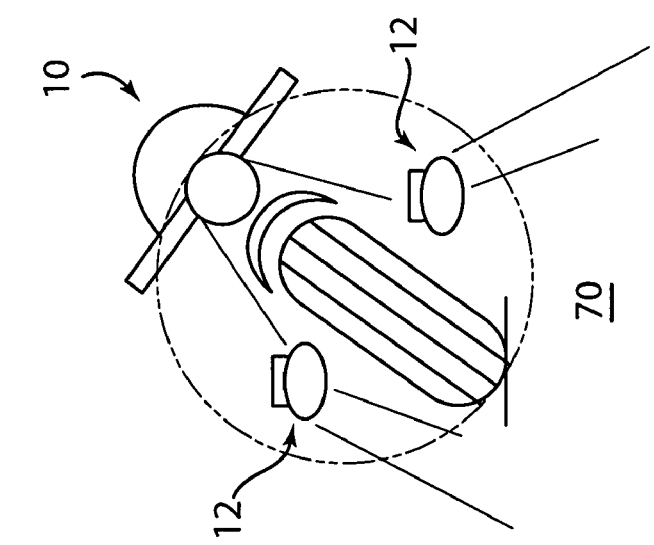

Once a motorcycle leans, as it normally does to make a turn a fixed light assembly (i.e., a light assembly that is normally fixed in place with respect to the motorcycle) will either shine light down into the ground or up into the air. In accordance with a highly advantageous feature, the light assemblies used herein pivot directly in response to the pull of gravity. FIGS. 2A–2C show the motorcycle 10 and the light assemblies 12. In FIG. 2A, the motorcycle is turning to the left and in response the light assemblies pivot about an axis horizontal to the motorcycle so as to stay in generally the same position with respect to the ground as they are when the motorcycle is vertically aligned (as seen in FIG. 2B). Similarly, in FIG. 2C, the motorcycle is turning to the right and leaning toward the right, and the light assemblies pivot directly in response to gravity so as to stay in the same alignment with the ground as in FIG. 2B. Thus, if the vehicle leans 5 degrees from vertical, the light assemblies, responding to the pull of gravity, each pivot in a direction generally opposite and equal to the lean of the vehicle. This adjustability provides an elegant, low cost technique for keeping the light assemblies from pointing into the ground or up into the air and eliminates the need for relatively expensive additional alignment equipment such as sensors, solenoids, gyroscopes, etc.

Figure 3:
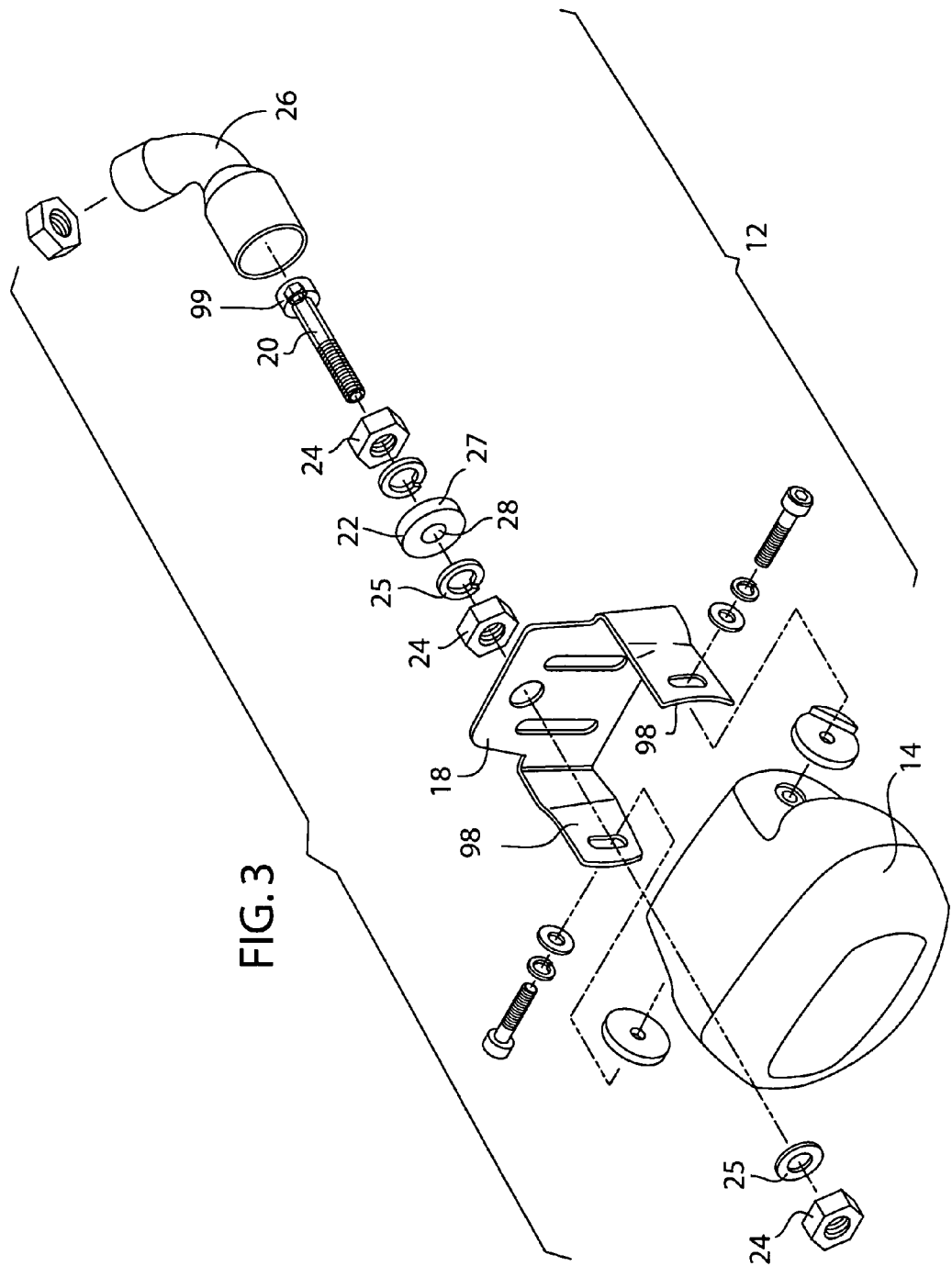
FIG. 3 is an exploded perspective view of the preferred embodiment of the light assembly shown in FIG. 1.

FIG. 3 discloses a preferred embodiment of an adjustable light assembly 12. Light 14 (preferably a vertical cut off light) is mounted on an attachment bracket 18. The attachment bracket may be C-shaped and the light is mounted between a pair of side flanges 98. The attachment bracket and the light are rotatable together with a bolt 20. In the preferred embodiment shown in FIG. 3, a connector 26 is elbow shaped to allow for ease of connection to the motorcycle, and has an opening sized to receive a bearing assembly 22 and the bolt 20. It will be readily apparent to those skilled in the art that other connector shapes, such as a straight connector, may be used depending upon the desired location of the light. The bearing assembly 22 is provided between the bolt 20 and the connector 26. Preferably the bearing assembly comprises a cylindrical bearing with an internal diameter 28 which bears against the bolt 20 and an external diameter 27 which bears against the connector 26. The external diameter is held fixed to the connector 26 by welding, adhesive, crimping of the end of the connector, etc and the bolt is free to rotate with respect to the bearing and the connector within the internal diameter. This construction captivates the bolt with respect to the vehicle, but permits rotation of the bolt and light with respect to the connector.

Preferably the bolt 20 is threaded and receives three pairs of nuts 24 and washers 25. A first nut/washer pair 24, 25 is positioned on the bolt 20 between the bearing assembly 22 and the head 99 of the bolt 20. A second nut/washer pair 24, 25 is positioned on the bolt 20 between the bearing assembly and the attachment bracket 18. As the bearing is held in place by attachment to the connector 26, the first two pairs of nuts and washers serve to hold the relative linear position of the bearing with respect to the bolt. The third nut/washer pair 24, 25, shown in the lower left in FIG. 3, is positioned on the bolt and secures the light 14 and attachment bracket 18 to the bolt. This third nut/washer pair rotatably captivates the light 14 and attachment bracket 18, permitting the light to pivot with the bolt 20 and cooperating with the bearing assembly to resist dislocation of the light from the connector. Thus, the bolt, light and bracket are rotatably captivated to the connector in that these components are free to rotate with respect to the connector but are prevented from linear dislocation by connection to the bearing assembly.

Optionally as shown in the drawings, the bolt may have an opening which allows wiring to run from the vehicle to the light 14. Alternatively, the bolt may be solid, and the wiring providing electricity to the light assembly may be mounted separate from the bolt. Other techniques for running the wiring to the light will be readily apparent to those skilled in the art given the benefit of this disclosure.

From the foregoing disclosure and detailed description of certain preferred embodiments, it will be apparent that various modifications, additions and other alternative embodiments are possible without departing from the true scope and spirit of the invention. For example, In addition to enhancing forward vision and visibility, light assemblies as disclosed herein may also offer enhanced rear visibility. Low visibility conditions, such as those produced by fog, smoke, or other ambiently-suspended particles, can increase the likelihood of highway collisions because of reduced visibility of vehicles moving along the same path. Vehicle manufacturers have attempted to enhance rear vehicle visibility by enabling the operator to selectively increase the luminosity of the left rear taillight, and thereby increase the detectability of a leading vehicle by a following vehicle. However, the output of such an "enhanced" taillights is necessarily limited because light scattering may daze or otherwise impair the vision of the following driver. Adjustable light assemblies as disclosed herein may optionally be combined with a red-spectrum fog lamp with a precise vertical cut-off, reducing light scattering above the horizon of vision of the following driver and extending the rearward visibility of the leading vehicle for a much greater distance that current enhanced taillights. Moreover, by reducing light scattering above the horizon vision, greater wattage than fixed light assemblies may be used, advantageously increasing illumination.

The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A light assembly for a vehicle which can lean with respect to a ground surface comprising, in combination:
    an attachment bracket;
    a light mounted on the attachment bracket; and
    a connector attached to the vehicle, wherein the attachment bracket is rotatably secured to the connector;
    wherein as the vehicle leans in a first direction the light pivots directly in response to the pull of gravity without the need for a sensor, a solenoid or a gyroscope, in a direction opposite the first direction of lean of the vehicle.

2. The light assembly of claim 1 wherein the attachment bracket has a pair of side flanges forming a C-shape, and the light is attached to the attachment bracket between the side flanges.

3. The light assembly of claim 1 further comprising a bolt rotatable with respect to the vehicle, which extends through the attachment bracket, wherein the attachment bracket is rotatable with the bolt.

4. The light assembly of claim 3 wherein the bolt is hollow, and wiring is positioned in the bolt adapted to electrically connect the light to a source of electricity.

5. The light assembly of claim 3 wherein the bolt is threaded and a nut and washer engages the bolt to secure the attachment bracket to the bolt so as to resist dislocation of the bolt from the attachment bracket.

6. The light assembly of claim 3 further comprising a bearing assembly positioned around the bolt so that the bolt is rotatably captivated with respect to the vehicle to permit relative rotation of the bolt with respect to the bearing assembly.

7. The light assembly of claim 1 wherein the vehicle is a motorcycle and the light is a vertical cutoff light.

8. The light assembly of claim 1 wherein the connector is rigidly connected to the vehicle.

9. The light assembly of claim 8 wherein the connector is elbow shaped and has an opening sized to receive a bearing assembly, and the bearing assembly is rigidly connected to the connector.

10. The light assembly of claim 1 further comprising left and right lights, each light positioned on a corresponding front portion of the vehicle.

11. The light assembly of claim 1 wherein the light is pivotable about a horizontal axis with respect to the vehicle.

12. A light assembly for a vehicle which can lean with respect to a ground surface comprising, in combination:
   an attachment bracket;
   a light mounted on the attachment bracket;
   a connector attached to the vehicle, wherein the attachment bracket is rotatably secured to the connector, wherein as the vehicle leans in a first direction the light pivots directly in response to the pull of gravity in a direction opposite the first direction of lean of the vehicle;
   a bearing assembly operatively connecting a bolt to the connector, wherein the bolt is rotatable with respect to the connector and rigidly connected to the attachment bracket; and
   a first nut secured to the bolt between the bearing assembly and a head of the bolt, a second nut secured to the bolt between the bearing assembly and the attachment bracket, and a third nut secured to the bolt between the attachment bracket and the light.

* * * * *